(12) United States Patent
Savtchenko

(10) Patent No.: US 8,091,857 B2
(45) Date of Patent: Jan. 10, 2012

(54) VALVE

(75) Inventor: Peter Savtchenko, New South Wales (AU)

(73) Assignee: Symutech Pty Limited, New South Wales (AU)

( * ) Notice: Subject to any disclaimer, the term of this patent is extended or adjusted under 35 U.S.C. 154(b) by 514 days.

(21) Appl. No.: 12/281,500

(22) PCT Filed: Mar. 5, 2007

(86) PCT No.: PCT/AU2007/000270
§ 371 (c)(1),
(2), (4) Date: Nov. 26, 2008

(87) PCT Pub. No.: WO2007/101295
PCT Pub. Date: Sep. 13, 2007

(65) Prior Publication Data
US 2009/0302260 A1    Dec. 10, 2009

(30) Foreign Application Priority Data
Mar. 7, 2006    (AU) ................ 2006901147

(51) Int. Cl.
*F16K 31/12*    (2006.01)
(52) U.S. Cl. .......................................... 251/31; 251/28

(58) Field of Classification Search ............ 251/25, 251/28, 31
See application file for complete search history.

(56) References Cited

U.S. PATENT DOCUMENTS

| | | | | |
|---|---|---|---|---|
| 3,635,436 A * | 1/1972 | Tillman | .................... | 251/31 |
| 4,068,112 A * | 1/1978 | Marhic | .................... | 219/121.22 |
| 4,099,904 A * | 7/1978 | Dawson | .................... | 425/563 |
| 4,412,671 A * | 11/1983 | Tiefenthaler | .................... | 251/31 |
| 5,415,378 A * | 5/1995 | Craven | .................... | 251/329 |
| 6,612,537 B2 * | 9/2003 | Bartlett | .................... | 251/62 |
| 2001/0042848 A1 | 11/2001 | Bartlett | | |

FOREIGN PATENT DOCUMENTS
EP    1 403 576    3/2004

OTHER PUBLICATIONS
International Search Report for PCT Application No. PCT/AU2007/000270; Filed Mar. 5, 2007; Date of Completion May 1, 2007; Date of Mailing May 9, 2007.

* cited by examiner

*Primary Examiner* — John Fristoe, Jr.
(74) *Attorney, Agent, or Firm* — Alston & Bird LLP

(57) ABSTRACT

A valve assembly (10) to regulate the flow of a refrigerant. The valve assembly (10) includes a movable valve member (25) to which there are attached two pistons (29 and 30). A refrigerant under pressure is applied to the pistons (29 and 30) to cause movement of the movable valve member (25) to connect or disconnect pipes (17 and 18) through which the refrigerant is to flow.

7 Claims, 3 Drawing Sheets

VALVE

TECHNICAL FIELD

The present invention relates to valves and more particularly but not exclusively to valves employed in refrigeration systems.

BACKGROUND OF THE INVENTION

Typically valves employed in refrigeration systems are solenoid valves. It is not uncommon for these solenoid valves to fail due to the pressure of refrigerant passing through the valves. For example the plunger of the valve can be drawn to the closed position due to the pressure difference across the plunger. Another disadvantage is that the valve can be rendered unable to operate by not being able to move the plunger to the open position. That is, the plunger can be maintained in the closed position unintentionally.

OBJECT OF THE INVENTION

It is the object of the present invention to overcome or substantially ameliorate at least one of the above disadvantages.

SUMMARY OF THE INVENTION

There is disclosed herein a valve assembly including:

a body having a bore with a longitudinal axis and surrounding a chamber, a first and a second opening in the body providing for fluid flow via the openings through the chamber;

a movable valve member located in the chamber and movable longitudinally thereof between a first position and a second position, said movable valve member having a transverse passage that is aligned with the openings when the valve member is in the first position to thereby provide for said fluid flow, and displaced relative to said openings to prevent fluid flow between the openings when this valve member is in the second position;

a first piston and a second piston, each of the pistons being attached to the valve member so the valve member is located longitudinally between the pistons, the pistons being operatively associated with the bore and valve member so as to define a first sub-chamber and a second sub-chamber, the first sub-chamber being located between the first piston and the valve member, and the second sub-chamber being located between the second piston and the valve member, the first piston also being operatively associated with the bore to provide a third sub-chamber, the third sub-chamber being located so as to be separated from the first sub-chamber by the first piston, the second piston being operatively associated with the bore to provide a fourth sub-chamber, the second piston being located so as to be positioned between the second sub-chamber and the fourth sub-chamber;

a first port, the first port being operatively associated with the third sub-chamber to provide for the flow of fluid with respect thereto;

a second port, the second port being operatively associated with the fourth sub-chamber to provide for the flow of fluid with respect thereto; and wherein said first sub-chamber and said second sub-chamber are in fluid communication, with said movable valve member being moved between the first and second positions thereof by fluid under pressure being delivered to the third sub-chamber or the first fourth sub-chamber.

Preferably, said assembly includes a movable valve member guide, said guide providing a pair of generally parallel longitudinally extending generally planar surfaces, with said valve member having planar surfaces slidably engaged with the surfaces of the guide so that the movable valve member is located between the guide surfaces.

Preferably, the first and second sub-chambers are in fluid communication. Preferably, fluid communication between the first and second sub-chambers is provided by a passage at least partly defined by said guide and valve member.

Preferably, said valve assembly includes a first end cap closing said third sub-chamber, and a second end cap closing said fourth sub-chamber.

Preferably, the caps provide stops defining said first and second positions

Preferably, the first and second sub-chambers receive the fluid under pressure delivered to the third and fourth sub-chambers.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
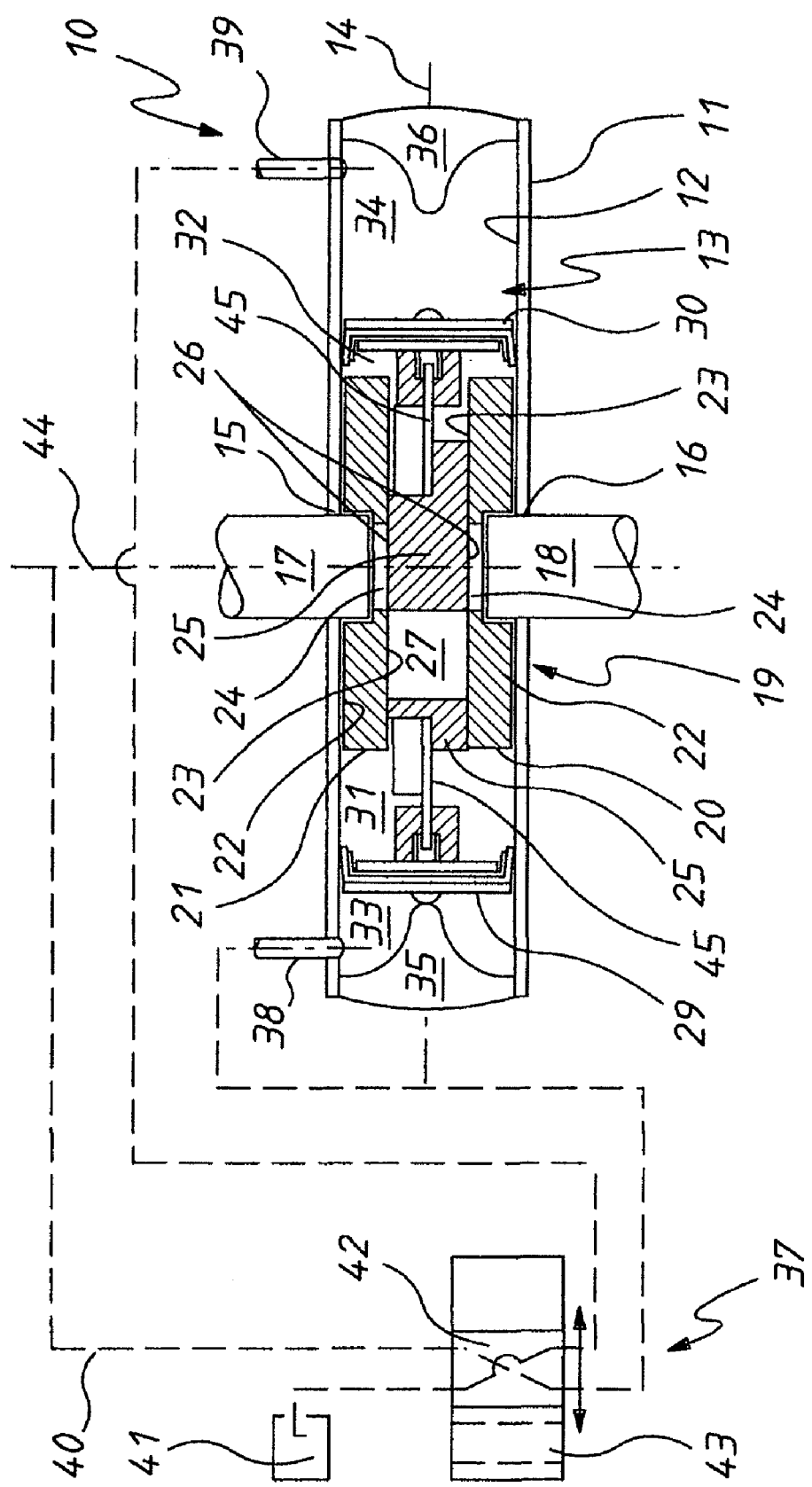
FIG. 1 is a schematic sectioned side elevation of a valve assembly and pilot valve therefore.

In the accompanying drawings there is schematically depicted a valve assembly 10. The assembly 10 includes a hollow body 11 providing an internal bore 12 of generally circular transverse cross-section. The bore 12 surrounds a chamber 13, the 5 chamber 13 having a longitudinal axis 14.

In this embodiment the valve assembly 10 is intended to be included in a refrigeration device, the valve 10 being intended to control the flow of compressed refrigerant. However it should be appreciated the valve assembly 10 may also be applied to pneumatics and hydraulics.

The body 12 has a first opening 15 that is transversely aligned with a second opening 16. Extending through the opening 15 is a high pressure pipe 17, while extending through the opening 16 is a pipe 18 to which the compressed refrigerant is delivered when the valve assembly 10 is in the "open" configuration. The pipes 17 and 18 are sealingly connected to the body 11 so that the chamber 12 is sealingly closed.

Located in the chamber 13 is a guide 19. The guide 19 consists of two guide plates 20 and 21, each having a radially outer arcuate surface 22 engaged with the bore and a radially inner parallel planar surface 23. Each plate 22 is attached to a respective one of the pipes 17, 18 so as to be sealingly connected thereto. More particularly each plate 22 has a passage 24 aligned with a respective one of the openings 15, with the passages 24 having a longitudinal axis 44 normal to the axis 14.

Figure 2:
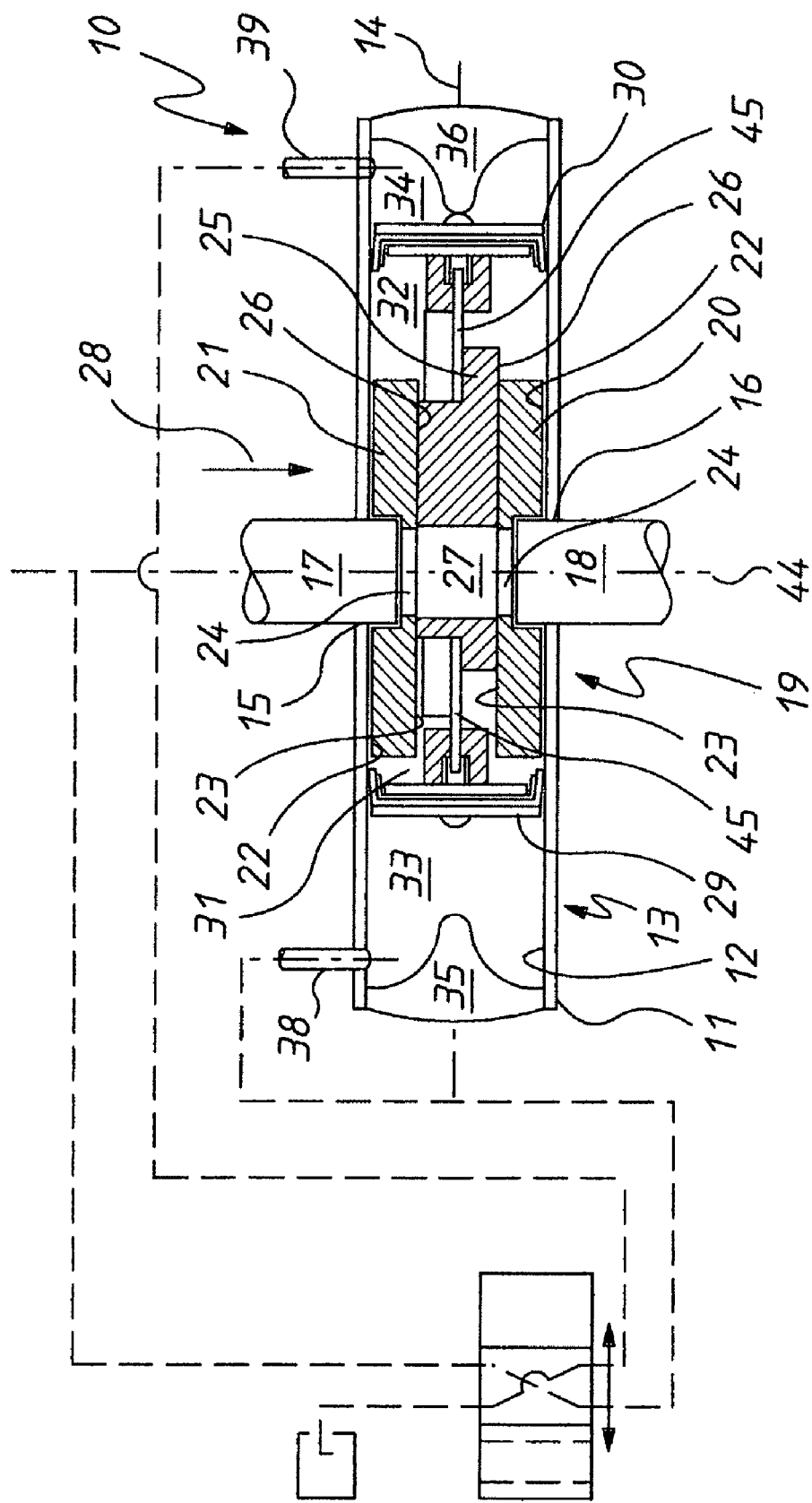
FIG. 2 is a schematic sectioned side elevation of the valve of FIG. 1.

Slidably located between the plates 22 is a movable valve member 25. The valve member 25 has parallel planar surfaces 26 slidably engaged with the surfaces 23 so that the movable valve member 25 is guided thereby. The valve member 25 is movable between a first position as shown in FIG. 2 and a second position as shown in FIG. 1 in a direction parallel to the axis 14. The valve member 25 has a transverse passage 27 that is aligned with the passages 24 and therefore pipes 17 and 18 when the valve member is in the first position (FIG. 2) to provide for the flow of refrigerant in the direction of the arrow 28, that is flow from the pipe 17 to the pipe 18. When in the second position the valve member 25 "closes" the valve assembly 10 to prevent flow through to the pipe 18. More particularly pressure in the pipe 17 urges the movable valve member 25 against the surface 23 of the plate 20 to provide for sealing contact between the valve member 25 and surface 23 of the plate 20.

Attached to the valve member 25 is a first piston 29, and a second piston 30 by links 45. The valve member 25 and pistons 29 and 30 divide the chamber 13 into a first sub-chamber 31, a second sub-chamber 32, a third sub-chamber 33 and a fourth sub-chamber 34. The first sub-chamber 31 is located between the valve member 25 and the first piston 29, the second sub-chamber 32 between the valve member 25 and second piston 30, while the first piston 29 separates the first sub-chamber 31 from the third sub-chamber 33, and the piston 30 separates the second sub-chamber 32 from the fourth sub-chamber 34.

The sub-chamber 33 is closed by means of an end cap 35 while the sub-chamber 34 is closed by an end cap 36. The end caps 35 and 36 are fixed to the body 1, and project inwardly so as to provide a "stop" for the valve member 25 (by engaging the pistons 29 and 30) to define the abovementioned first and second positions of the valve member 25.

Operatively associated with the valve assembly 10 is a pilot valve 37. The pilot valve 37 would be typically a solenoid operated valve and would control the delivery of fluid under pressure (in this embodiment the refrigerant under pressure) to sub-chambers 33 and 34. More particularly there is attached to the body 11 pipes 38 and 39 that provide ports in respect of sub-chambers 33 and 34 for the delivery and removal of refrigerant with respect thereto.

The pilot valve 37 receives refrigerant under pressure from the pipe 17 or a position upstream thereof so as to receive the refrigerant under pressure. More particularly the refrigerant under pressure is delivered to the valve 37 by means of a pipe 40. By operation of the valve 37 the refrigerant under pressure can be delivered to the pipe 38 or the pipe 39. The valve 37 is also connected to a low pressure portion of the refrigeration device, such as a reservoir 41. The valve 37 selectively connects one of the pipes 38 or 39 to the reservoir 41, so that when the sub-chamber 33 is receiving refrigerant under pressure, the sub-chamber 34 is being vented to the reservoir 41. Conversely when the sub-chamber 34 is receiving refrigerant under pressure, the sub-chamber 33 is being vented to the reservoir 41. Typically the valve 37 would be a spool valve having port segments 42 and 43 to co-ordinate delivery as discussed above.

The plates 20 and 21 and movable valve member 25 are constructed relative to the bore 12 so that the fluid (refrigerant) can pass between the sub-chambers 31 and 32. For example, there may be passages between the plates 20 and 21 and the bore 12 to provide for flow between the sub-chambers 31 and 32.

It should also be appreciated that the construction of the valve member 25 with respect to the plates 20 and 21 is such that refrigerant under pressure is delivered to the sub-chambers 31 and 32. For example, when the valve member 25 is urged against the plate 20, there is sufficient clearance between the valve member 25 and the plate 21 to provide a passage for the flow of refrigerant from the pipe 17 to the sub-chambers 31 and 32.

In operation of the above described valve assembly 10, when the pilot valve 37 is operated (as shown in the drawings) to deliver compressed refrigerant to the sub-chamber 33, the valve member 25 will be caused to move from the position shown in FIG. 1 (second position) to the position as shown in FIG. 2 (first position). More particularly, since refrigerant under pressure exists in the sub-chambers 31, 32 and 33, there is a pressure differential across the piston 30 as the sub-chamber 34 is being vented to the tank 41. Accordingly this pressure differential across the piston 31 will cause the valve member 25 to move to the position shown in FIG. 2 from the position shown in FIG. 1. When the pilot valve 37 is operated to deliver refrigerant under pressure to the sub-chamber 34, it will simultaneously connect the sub-chamber 33 to the reservoir 41. Accordingly there is then a pressure differential across the piston 29 that will cause the valve member 25 to move from the position shown in FIG. 2 to the position shown in FIG. 1. Again when this occurs there is equal pressure in the sub-chambers 31, 32 and 34.

It should further be appreciated the valve assembly 10 may be operated to provide for flow in the reverse of the direction 28. In this arrangement, the refrigerant under pressure in the pipe 18 will urge the movable valve member 25 into sealing contact with the surface 23 so that when in the position shown in FIG. 1, flow into the pipe 17 is prevented. When this occurs the valve member 25, when closing the passage 24 leading to the pipe 17, will be urged into sealing contact with the surface 23 of the plate 21. A passage will then exit between the valve member 25 and surface 23 of the plate 21 to deliver refrigerant to the chambers 31 and 32. When the passage 27 is aligned with the pipes 17 and 18, again the clearance between the valve member 25 and surface 23 will allow the refrigerant under pressure to flow to sub-chambers 31 and 32. That is, there is a passage or passages provided between the surfaces 23 and 26. The pipe 40 would take refrigerant under pressure from the pipe 18.

Figure 3:
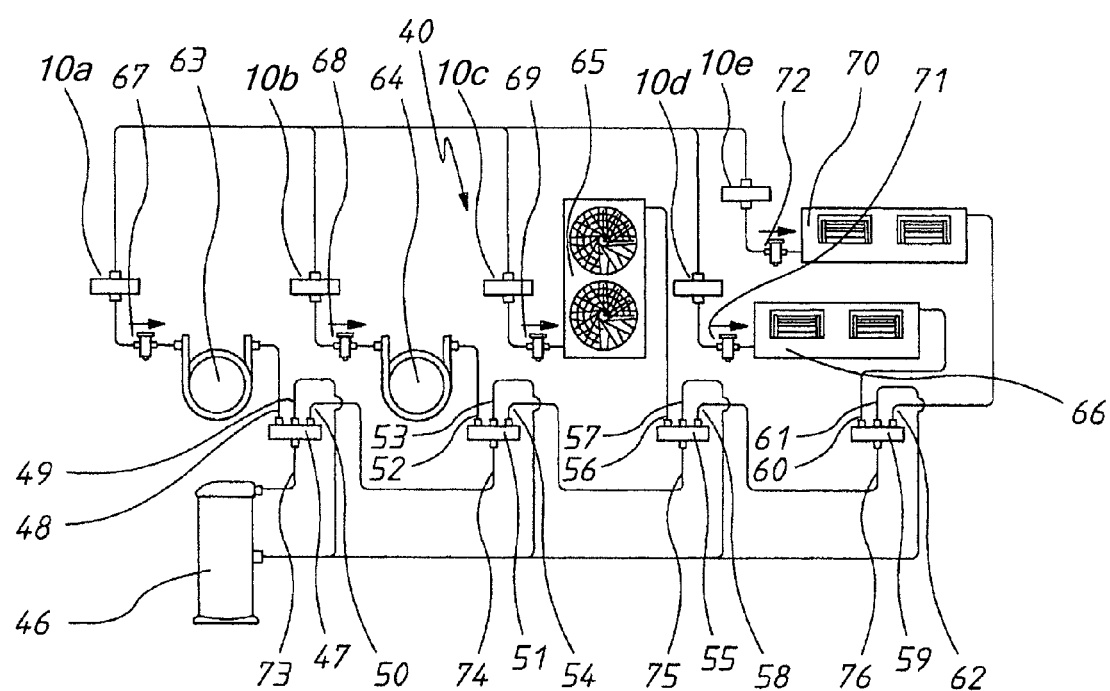
FIG. 3 is a schematic illustration of a refrigerant system.

The valve assembly 10 of FIGS. 1 and 2 can be incorporated in the system 40 of FIG. 3. In this embodiment valves 10a to 10e are identical to the valve assembly 10 previously described.

In the system 40 a compressor 46 delivers compressed refrigerant to a valve 47. The valve 47 has three ports 48, 49 and 50, with the port 49 being connected to the low pressure side of the compressor 46. Three further valves 51, 55 and 59 are provided, each with three ports as labelled in FIG. 3. The ports 53, 57 and 61 are all connected to the low pressure side of the compressor 46. The ports 48, 52, 56 and 60 are connected to heat exchangers 63, 64, 65 and 66. The port 50 is connected to the valve 51, the port 54 is connected to the valve 55, and the port 58 connected to the valve 59.

Interposed between each heat exchanger 63, 64 and 65 and its associated valve 10a, 10b, and 10c is a restriction device 67, 68 and 69. The valves 10a, 10b, and 10c are also connected to the valves 10d and 10e, with the valve 10e being connected to a heat exchanger 70 and the valve 10d connected to the heat exchanger 66. Between the heat exchangers 66 and 70 and their associated valves 10d and 10e there is provided restriction devices 71 and 72. Typically the devices 67, 68, 69, 71 and 72 are expansion valves that cause expansion of refrigerant passing therethrough in one direction only. Each of the devices 67 to 72 cause expansion of the refrigerant in the direction of the associated arrows but all essentially unrestricted flow in the opposite direction.

Each of the valves 47, 51, 55 and 59 is a "reversing valve". The valve 47 has an inlet port 73, the valve 51 an inlet port 74, the valve 55 an inlet port 75, and the valve 59 an inlet port 76. The port 50 is connected to the port 74, the port 54 is connected to the port 75, while the port 58 is connected to the port 76. Each of the ports 49, 53, 57 and 61 is connected to the low pressure side of the refrigerant compressor 46.

The valves 47, 51, 55 and 59 are substantially identical and operate as follows. The operation of each of these valves 47, 51, 55 and 59 will be described with reference to valve 47. For example in valve 47, the valve 47 is operable to selectively connect the port 73 to the port 48 or the port 50. If the port 73 is connected to the port 48, then the port 49 is connected to the port 50. Similarly if the port 73 is connected to the port 50, then the port 49 is connected to the port 48. Accordingly by operation of the valves 47, 51, 55 and 59 the direction of flow of refrigerant through the system 10 can be reversed.

Each of the valves 10a to 10e is operable to prevent refrigerant passing through the associated heat exchanger. For example the valve 10a if in the "closed" position prevents refrigerant flowing through the heat exchanger 63.

In one example if compressed refrigerant is to be delivered to the heat exchanger 63, then the valve 47 is operated to connect the port 73 to the port 48. This will then cause the port 49 to be connected to the port 50. Compressed refrigerant is delivered to the heat exchanger 63 from where heat is extracted from the refrigerant. The valve 10a would be in the open position allowing refrigerant to circulate. The refrigerant from the valve 10a would pass through the valve 10a (also in the open position) and through the restriction device 72 to ensure that the refrigerant is expanded. The expanded refrigerant passes through the heat exchanger 70 that draws heat in. The refrigerant is then returned through the valve 59 to the low pressure side of the compressor 46. Accordingly the valve 59 is configured so as to connect ports 62 and 61.

The valves 51, 55 could be similarly operated to cause refrigerant to pass through the heat exchangers 64 and 65. If valves 10b and 10c are open, the refrigerant will expand into heat exchanger 65, and then pass to port 56 and then 57 from where it would return to the low pressure side of the compressor.

The direction of flow of refrigerant in the system 10 can be reversed by operation of the valves 47, 51, 55 and 59. For example compressed refrigerant could be delivered to the port 50 from the port 73 from where would flow through valves 51, 55 and 59 to the heat exchangers 66 and 70. The valves 10a, 10b, 10c, and 10e could then be selectively opened to pass refrigerant through a selected one or more of the heat exchangers 63, 64 or 65 or 70.

As specific examples, the heat exchanger 64 could be a water heater exchanger and the heat exchanger 65 an outside condenser. The heat exchangers 66 and 70 could be in door air fan coil heat exchangers.

The valves 10d and 10e are operated to determine whether one or both of the heat exchangers 66 and 70 are operative, by having the valves 10d and 10e in the open position permitting flow or the closed position preventing flow.

The valve assembly 10 (valves 10a to 10e) can operate to selectively prevent the flow of refrigerant irrespective of the direction of flow through the assembly 10.

The invention claimed is:

1. A valve assembly to control flow of a fluid under pressure including:
    a body having a bore with a longitudinal axis and surrounding a chamber, a first and a second opening in the body providing for fluid flow via the openings through the chamber;
    a movable valve chamber located in the chamber and movable longitudinally thereof between a first position and a second position, said movable valve member having a transverse passage that is aligned with the openings when the valve member is in the first position to thereby provide for said fluid flow, and displaced relative to said openings to said second position to prevent fluid flow between the openings when this valve member is in the second position;
    a first piston and a second piston, each of the pistons being attached to the valve member so the valve member is located longitudinally between the pistons, the pistons being operatively associated with the bore and valve member so as to define a first sub-chamber and a second sub-chamber being located between the second piston and the valve member, the first piston also being operatively associated with the bore to provide a third sub-chamber by the first piston, the second piston being operatively associated with the bore to provide a fourth sub-chamber, the second piston being located so as to be positioned between the second sub-chamber and the fourth sub-chamber;
    a first port, the first port being operatively associated with the third sub-chamber to provide for the flow of fluid with respect thereto;
    a second port, the second port being operatively associated with the fourth sub-chamber to provide for the flow of fluid with respect thereto;
    a valve member guide, said guide providing a pair of generally parallel longitudinally extending guide surfaces, with said valve member being slidably engaged with the guide surfaces so that the movable valve member is located between the guide surfaces, the guide including a pair of guide plates providing said guide surfaces between which the valve member is located so as to be guided thereby, each guide plate having a guide fluid flow passage aligned with a respective one of the first and second openings; and wherein
    said first sub-chamber and second sub-chamber are in fluid communication, with said movable valve member being moved between the first and second positions thereof by fluid under pressure being delivered to the third sub-chamber or the fourth sub-chamber depending on the direction in which the movable valve member is to be moved.

2. The valve assembly of claim 1, wherein the fluid communication between the first and second sub-chambers is provided by a passage at least partly defined by said guide and valve member.

3. The valve assembly of claim 1, wherein said valve assembly includes a first end cap closing said third sub-chamber, and a second end cap closing said fourth sub-chamber.

4. The valve assembly of claim 3, wherein the caps provide stops defining said first and second positions.

5. The valve assembly of claim 1, wherein the first and second openings receive the fluid under pressure delivered to the third and fourth sub-chambers.

6. The valve assembly of claim 1, wherein the fluid communication between the first and second sub-chambers is provided by a passage at least partly defined by said guide and valve member, the valve assembly further includes a first end cap closing said third chamber, and a second end cap closing said fourth sub-chamber, with the caps providing stops defining said first and second positions, and the first and second openings receive the fluid under pressure delivered to the third and fourth sub-chambers, and wherein said guide surfaces are planar.

7. The valve assembly of claim 1, wherein said guide surfaces are planar.

* * * * *